US012809442B2

(12) United States Patent
Periyaeluvan et al.

(10) Patent No.: US 12,809,442 B2
(45) Date of Patent: Nov. 24, 2026

(54) INTER-PROCESSOR COMMUNICATION-BASED HANDOFF OF PROGRAM EXECUTION BETWEEN MICROCONTROLLER UNITS USING SHARED MEMORY

(71) Applicant: Cypress Semiconductor Corporation, San Jose, CA (US)

(72) Inventors: Rakesh Eluvan Periyaeluvan, Bangalore (IN); Vikas Dineshkumar Shah, Vijayanagar (IN); Deepak Poongundrun, Virudhunagar (IN)

(73) Assignee: Infineon Technologies Americas Corp., El Segundo, CA (US)

( * ) Notice: Subject to any disclaimer, the term of this patent is extended or adjusted under 35 U.S.C. 154(b) by 549 days.

(21) Appl. No.: 18/471,020

(22) Filed: Sep. 20, 2023

(65) Prior Publication Data

US 2025/0093935 A1 Mar. 20, 2025

(51) Int. Cl.

*G06F 1/3209* (2019.01)
*G06F 1/3234* (2019.01)
*G06F 1/324* (2019.01)

(52) U.S. Cl.

CPC ............ *G06F 1/3209* (2013.01); *G06F 1/324* (2013.01); *G06F 1/3243* (2013.01)

(58) Field of Classification Search

CPC ...... G06F 1/3209; G06F 1/324; G06F 1/3243; G06F 1/3287; G06F 1/3293

USPC .......................................................... 713/323

See application file for complete search history.

(56) References Cited

U.S. PATENT DOCUMENTS 6,240,521 B1 * 5/2001 Barber .................... G06F 9/461 713/323
6,289,464 B1 * 9/2001 Wecker ................. G06F 1/1698 713/320
7,962,775 B1 * 6/2011 Vaidyu .................. G06F 1/3203 713/323
2009/0259865 A1 * 10/2009 Sheynblat ............ G06F 1/3203 713/323
2017/0003728 A1 * 1/2017 Meng .................... G06F 1/3293

* cited by examiner

*Primary Examiner* — Chun Cao

(57) ABSTRACT

Implementing a program such as a network connectivity manager in high-performance or low-power mode. The method may include a first microcontroller unit (MCU) receiving a first message while implementing a program in active mode. The first MCU generates and sends a first inter processor communication (IPC) message to a second MCU in response to the first MCU receiving the first message. The first MCU transitions from active mode to sleep mode after the first MCU sends the first IPC message to the second MCU. The second MCU transitions from sleep mode to active mode in response to the second MCU receiving the first IPC message. The second MCU implements the program after transitioning to active mode. The first MCU is in sleep mode while the second MCU implements the program. The second MCU consumes more power operating in active mode than the first MCU consumes while operating in active mode.

18 Claims, 5 Drawing Sheets

Fig. 3

INTER-PROCESSOR COMMUNICATION-BASED HANDOFF OF PROGRAM EXECUTION BETWEEN MICROCONTROLLER UNITS USING SHARED MEMORY

TECHNICAL FIELD

The present disclosure relates generally to the field of data communication, and more particularly, to systems and methods for sharing a program such as a connectivity manager between a high-performance processing device and a low-power processing device.

BACKGROUND

A microcontroller (MCU) is a small processing device that is fabricated on a single integrated circuit (IC) chip. A microcontroller contains a central processing unit (CPU) along with memory and programmable input/output peripherals. Program memory in the form of RAM, NOR flash or ROM is also often included on chip. Microcontrollers are designed for embedded applications, in contrast to the microprocessors used in personal computers.

A CPU, also called a processing core, is an electronic circuit that executes instructions stored in memory. Principal components of a CPU include the arithmetic-logic unit (ALU) that performs arithmetic and logic operations, processor registers that supply operands to the ALU and store the results of ALU operations, and a control unit that orchestrates the fetching from memory, decoding and execution of instructions by directing the coordinated operations of the ALU, registers and other components.

BRIEF DESCRIPTION OF THE DRAWINGS

The present disclosure is illustrated by way of example, and not by way of limitation, in the figures of the accompanying drawings in which like reference numerals refer to similar elements and in which.

DETAILED DESCRIPTION

Figure 1:
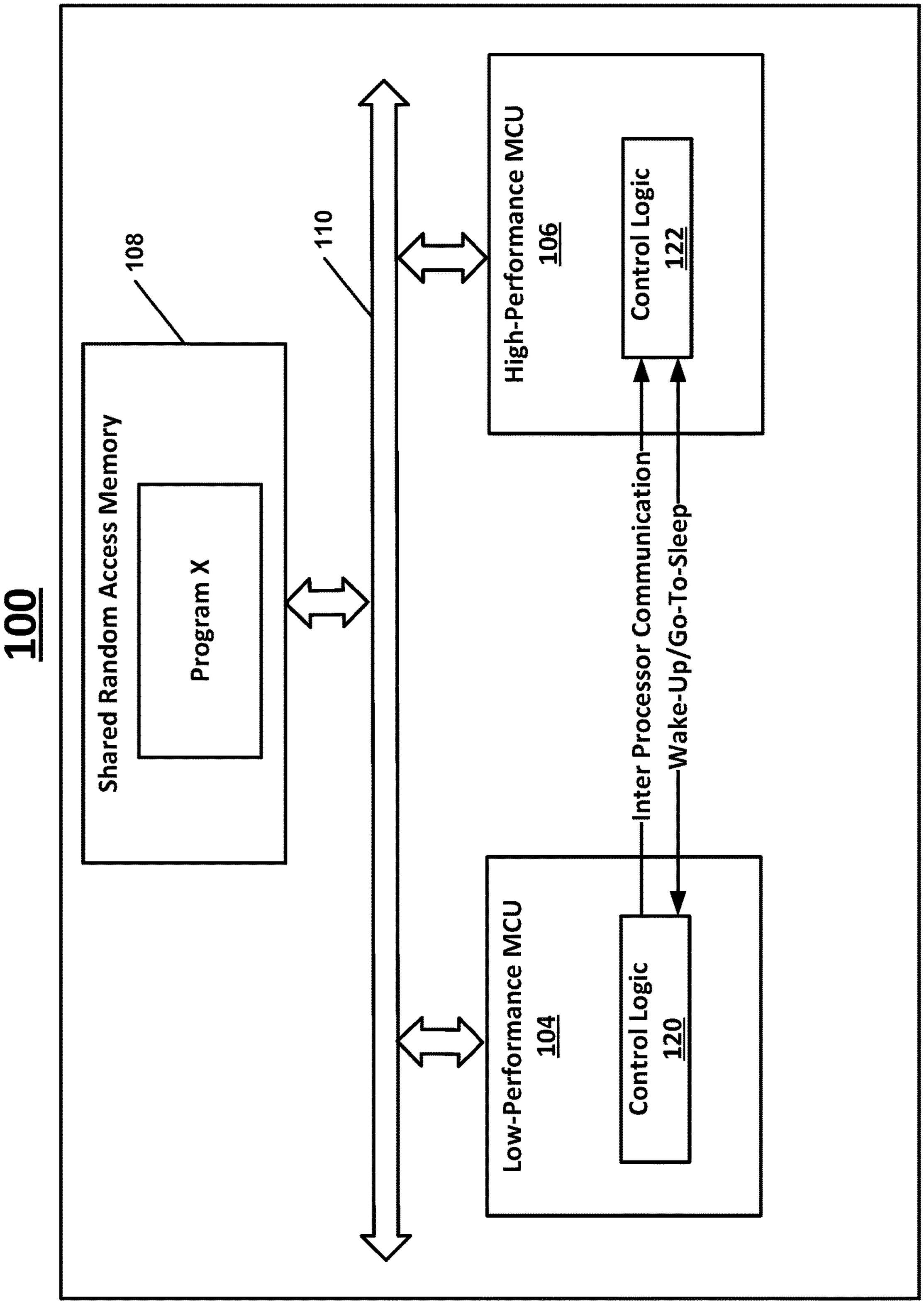
FIG. 1 is a block diagram illustrating relevant components of an IC employing one embodiment of the present disclosure.

The following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

MCUs vary in performance. Factors affecting MCU performance include type (e.g., 8-bit, 16-bit, etc.), clock speed, I/O speed, etc. A high-performance MCU may be more expensive to manufacture than a low-performance MCU because of physical differences. The present disclosure will distinguish high-performance MCUs from low-performance MCUs primarily by clock speed, it being understood that other factors (e.g., type) may affect performance.

High-performance MCUs operate faster and execute more instructions than low-performance MCUs but consume more power, which may be a problem if the high-performance MCU is powered by a battery. Low-performance MCUs are cheaper and to make and consume less power but operate at a slower speed. For purposes of explanation only, the present disclosure will be described with reference to a pair of MCUs that are powered by a battery.

The present disclosure provides a method and apparatus for addressing the high-performance/low-performance MCU dilemma mentioned above. FIG. 1 is a block diagram illustrating an example IC 100 employing one embodiment of the present disclosure. IC 100 includes a low-performance MCU 104 and a high-performance MCU 106. In an alternative embodiment, MCUs 104 and 106 are provided on separate ICs. Each MCU 104 and 106 includes one or more CPUs (not shown). For purposes of explanation only, each MCU 104 and 106 includes a single CPU. Although not shown in FIG. 1, a battery provides supply voltages for use by MCUs 104 and 106. The supply voltages used by the MCUs may differ in magnitude.

Both MCUs 104 and 106 are in data communication with shared random-access memory (RAM) 108 via peripheral data bus 110. Because RAM 108 is shared, any specific location in RAM 108 can be accessed by both MCUs. RAM 108 stores a program X, such as a network connectivity manager more fully described below, that can be shared by MCU's 104 and 106. Either MCU 104 or MCU 106 can execute program X, but not at the same time. MCUs 104 and 106 include control logic modules 120 and 120, respectively, that coordinate execution of program X between the MCUs.

High-performance MCU 106 operates at a clock speed that is higher than the clock speed at which low-performance MCU 104 operates. With a higher clock speed, high-performance MCU 106 can execute instructions of program X faster than low-performance MCU 104. However, high-performance MCU 106 will consume more power and drain the battery faster than low-performance MCU 104 when executing program X. MCU 104 may be cheaper to manufacture than MCU 106.

Program X includes multiple functions, which can be allocated on an MCU-by-MCU basis. High-performance MCU 106 can be designated to implement one or more functions of program X, while low-performance MCU 104 can be designated to implement another one or more functions of program X. The designations can be defined through appropriate configuration of control logic modules 120 and 122.

Figure 2:
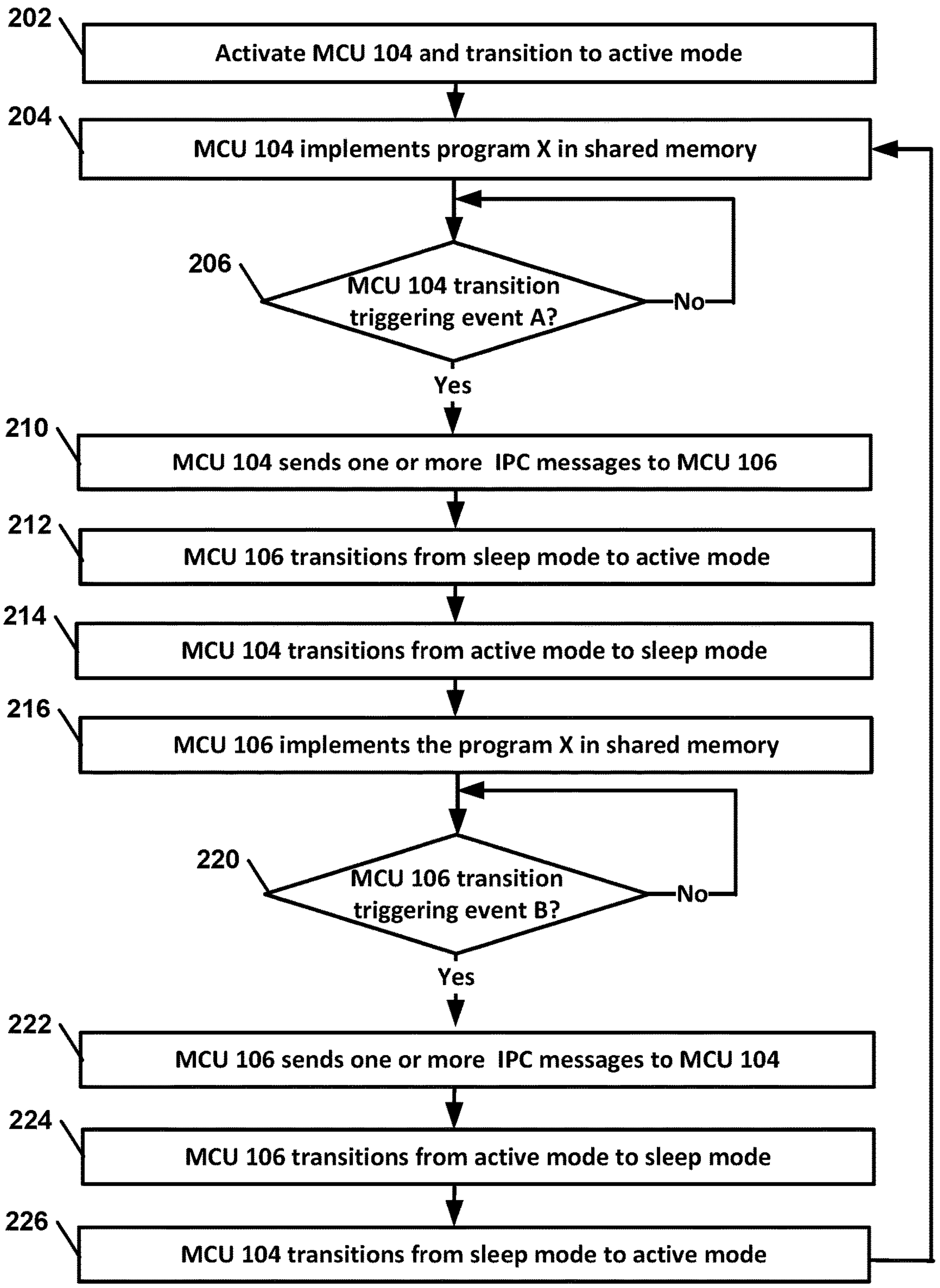
FIG. 2 is a flow chart illustrating relevant aspects of a process implemented by the IC of FIG. 1 in accordance with one embodiment of the present disclosure.

FIG. 2 illustrates relevant operational aspects of a method performed by IC 100 according to one embodiment of the present disclosure. The process begins in step 202 when low-performance MCU 104 activates and transitions to active mode. In active mode, low-performance MCU 104 can execute instructions of program X at full clock speed. In step 204 low-performance MCU 104 begins executing instructions of program X in shared memory 108. More particularly low-performance MCU 104 begins executing instructions of a first function of program X to which it is allocated. For example, the first function may be an implementation of a passive or active open of a network-manager more fully described below. As low-performance MCU 104 executes instructions, control logic 120 monitors for a specific transition triggering event A. For example, logic 120 can monitor for a specific packet that is received by low-performance MCU 104. In response to the occurrence of transition triggering event A, control logic 120 sends a one or more inter-processor communication (IPC) messages to high-performance MCU 106 via peripheral data bus 110 as shown in step 210. Although not shown, low-performance MCU 104 may set state variables in memory 108 for program X before MCU 104 sends the one or more IPC messages. The one or more IPC messages may indicate that transition triggering event A has occurred. The one or more IPC messages may also include a handle (i.e., an address) in memory 108 where program X is stored, or where a second function of program X is stored. The one or more IPC messages may also include a message for high-performance MCU 106 to "wake up."

In step 212 high-performance MCU 106 transitions from sleep mode to active mode in response to receiving the one or more IPC messages. Sleep mode, sometimes called standby or suspend mode, is a power-sparing state that an MCU enters when not in use. In step 214 low-performance MCU 104 transitions from active mode to sleep mode. Thereafter, in step 216 high-performance MCU 206 begins implementing program X in shared memory 108 at the handle provided by the one or more IPC messages that were sent by low-performance MCU 104 in step 210. High-performance MCU 106 may begin implementing a second function of program X allocated to it in step 216. For example, high-performance MCU 106 may begin a process for reading/writing data. While executing program X, control logic 122 monitors for the occurrence of a specific transition triggering event B as shown in step 220. For example, high-performance MCU 106 may enter an idle phase in which it is not executing instructions of program X. Transition triggering event B may be defined as a predetermined amount of time in which high-performance MCU 106 is in the idle phase. Control logic 122 can monitor idling time of high-performance MCU 106. If the idling time exceeds the predetermined amount of time, transition triggering event B has occurred.

In response to detecting the occurrence of transition triggering event B, high-performance MCU 106 generates and sends one or more IPC messages to low-performance MCU 104 via peripheral data bus 110 as shown in step 222. The one or more IPC messages sent to low-performance MCU 104 may include an indication that transition triggering event B has occurred. The one or more IPC messages sent to low-performance MCU 104 may include a handle for program X in memory 108. One or more IPC messages may include a message for low-performance MCU 104 to wake up.

In response to sending the one or more IPC messages high-performance MCU 106 transitions from active mode to sleep mode to conserve energy in the battery. In response to receiving the one or more IPC messages from high-performance MCU 106, low-performance MCU 104 transitions from sleep mode to active mode as shown in step 226. Thereafter, MCU 104 resumes executing instructions of program X as shown in step 204, and the process repeats.

MCUs execute instructions of a program. For example, MCUs can execute instructions of a network connectively manager program (hereinafter network-manager). The present disclosure will be made with respect to high-performance and low-performance MCUs executing instructions of a shared network-manager, the present disclosure should not be limited thereto.

A network-manager can perform various networking operations. For example, the network-manager can establish data connections between endpoints (e.g., devices that are at physically end points on a network). The network-manager can transmit data to or receive data from a connected endpoint using a suite of communication protocols such as Transmission Control Protocol/Internet Protocol (TCP/IP) suite. The present disclosure will be made with reference to a network-manager that implements the TCP/IP suite (hereinafter TCP/IP), it being understood the present disclosure should not be limited thereto.

TCP/IP specifies how data is exchanged over the Internet by providing end-to-end communications that identify how data should be broken into packets, addressed, transmitted, routed, and received at the destination. TCP/IP requires little central management and is designed to make networks reliable with the ability to recover automatically from the failure of any device on the network.

TCP and IP are the two main protocols of the TCP/IP suite. TCP and IP serve specific functions. TCP defines how endpoint processes can create data connections across a network. It also manages how a message is assembled into smaller packets before it is then transmitted over the Internet and reassembled in the right order at the destination address. IP defines how to address and route each packet to make sure it reaches the right destination.

Network data is communicated through "ports." A port is a number assigned to uniquely identify an endpoint process. A port can be seen as a logical channel through which data can be transmitted to or received from an endpoint process. An endpoint may have multiple processes running, and each of these processes is identified using the port number on which it is running. A network-manager can associate its input or output channels via an Internet socket associated with a transport protocol, a network address such as an IP address, and a port number. This is known as binding. A socket is used by an endpoint process to send and receive data via the network. A network-manager can transmit outgoing data from all ports onto the network, and forward arriving network packets to processes by matching the packet's IP address and port number to a socket. For TCP, only one process may bind to a specific IP address and port combination.

To establish a data connection between endpoints, TCP uses a three-way handshake. Before a first endpoint attempts to connect with a second endpoint, the second endpoint may first bind to and listen at a port to open it up for connections. This is called a passive open. Once the passive open is established, the first endpoint may initiate an active open. To establish a connection, a three-way (or 3-step) handshake typically occurs. The active open is performed by the first endpoint sending a synchronization SYN message to the second endpoint. The first endpoint sets a segment's sequence number to a random value A. In response to receiving the SYN message, the second endpoint replies with a synchronization-acknowledgement SYN-ACK message. An acknowledgment number is set to one more than the received sequence number (A+1), and the sequence number that the second endpoint chooses for the packet is another random number, B. Finally, the first endpoint sends an acknowledgement ACK message back to the second endpoint. The sequence number is set to the received acknowledgement value i.e. A+1, and the acknowledgement number is set to one more than the received sequence number i.e., B+1. At that point, both endpoints have received an acknowledgment of the connection. The first two steps establish the connection parameter (sequence number) for one direction and it is acknowledged. The second two steps establish the connection parameter (sequence number) for the other direction and it is acknowledged. With these, a full-duplex communication is established.

Connection termination may use a four-way handshake, with each side of the connection terminating independently. When an endpoint wishes to stop its half of the connection, it transmits a finish FIN message, which the other endpoint acknowledges with an ACK message. Therefore, a typical termination requires a pair of FIN and ACK messages from each endpoint. After both FIN/ACK exchanges are concluded, the endpoint which sent the first FIN before receiving one waits for a timeout before finally closing the connection, during which time the local port is unavailable for new connections; this prevents confusion due to delayed packets being delivered during subsequent connections.

A connection can be "half-open," in which case one side has terminated its end, but the other has not. The side that has terminated can no longer send any data into the connection, but the other side can. The terminating side should continue reading the data until the other side terminates as well.

Figure 3:
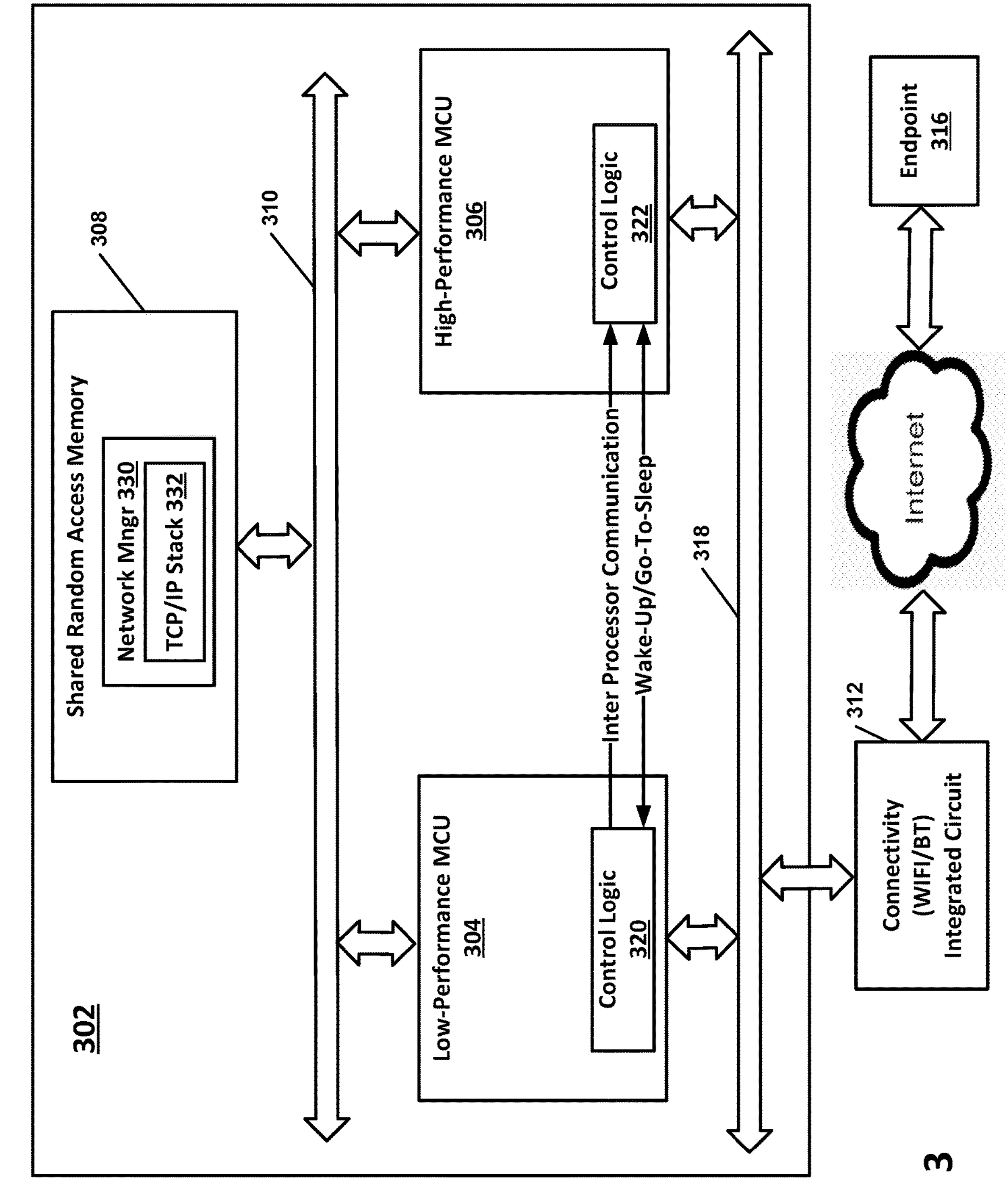
FIG. 3 is a block diagram illustrating an endpoint employing one embodiment of the present disclosure.

FIG. 3 illustrates an example endpoint 300 employing one embodiment of the present disclosure. Endpoint 300 includes an IC 302 (e.g., an SoC) that includes a low-performance MCU 304 and a high-performance MCU 306. In an alternative embodiment, MCU's 304 and 306 are provided on separate ICs. For purposes of explanation only, each MCU 304 and 306 includes a single CPU, it being understood that MCUs should not be limited thereto. MCUs 304 and 306 are in data communication with shared RAM 308 via peripheral data bus 310. Because RAM 380 is shared, any specific location can be accessed by both MCU 304 and MCU 306. In the embodiment shown, RAM 308 stores a network-manager 330 that includes a TCP/IP stack 332.

Endpoint 300 also includes a connectivity IC 312 in data communication with MCUs 304 and 306 through peripheral data bus 318. Connectivity IC 312 can establish a Wi-Fi or Bluetooth communication link with the Internet. Either MCU 304 or MCU 306 can access connectivity IC 312. Although not shown, it will be presumed that endpoint 300 includes a battery for powering MCU 304 and 306. The magnitude of the supply voltages provided to MCUs 304 and 306 can be different. FIG. 3 shows connectivity IC 312 and IC 302 as separate integrated circuits. In an alternative embodiment, IC connectivity can be integrated into IC 302.

High-performance MCU 306 operates at a clock speed that is higher than the clock speed at which low-performance MCU 304 operates. With a higher clock speed, high-performance MCU 306 can execute instructions of a network-manager 330 faster than low-performance MCU 304. However, high-performance MCU 306 will consume more power and drain the battery faster than low-performance MCU 304 when implementing network-manager 330. Moreover, high-performance MCU 306 may be bigger and made with more transistors. As a result, high-performance MCU 306 may cost more to manufacture than low-performance MCU 304.

Network-manager 330 provides networking operations. Either MCU 304 or 306 can implement the operations, but not at the same time. For example, MCU 304 or MCU 306, but not both at the same time, can implement passive and active opens while executing instructions of network-manager 330. After a network connection is established with, for example, endpoint 316, MCU 304 or MCU 306, but not both MCU and MCU 306 at the same time, can transmit data to or receive data from endpoint 316 while MCU 304 or MCU 306 implements TCP/IP stack 332. As will be more fully described below, MCUs 304 and 306 include control logic modules 320 and 322, respectively, that arbitrate with each other to determine which of MCUs 304 and 306 will have exclusive control to implement network-manager 330.

High-performance MCU 306 operates at a clock speed that is higher than the clock speed at which low-performance MCU 304 operates. With a higher clock speed, high-performance MCU 306 can execute instructions of network-manager 330 faster than low-performance MCU 304. For example, high-performance MCU 306 can receive data (i.e., read) from or transmit data (i.e., write) to, for example, endpoint 316 at a rate that is faster than the rate at which MCU 304 can read/write data. However, high-performance MCU 306 may consume more power and drain the battery faster than low-performance MCU 304 when implementing network-manager 330.

Either MCU 304 or MCU 306 could implement the same operations of network manager 330 although at different speeds. The operations of network manager software 330 can be allocated on an MCU-by-MCU basis; High-performance MCU 306 can be designated to implement a first set of one or more operations of network-manager 330, while MCU 304 can be designated to implement a second set of one or more operations of network-manager 330, where the first and second sets are different. The designations can be defined through control logic modules 320 and 322.

Figure 4:
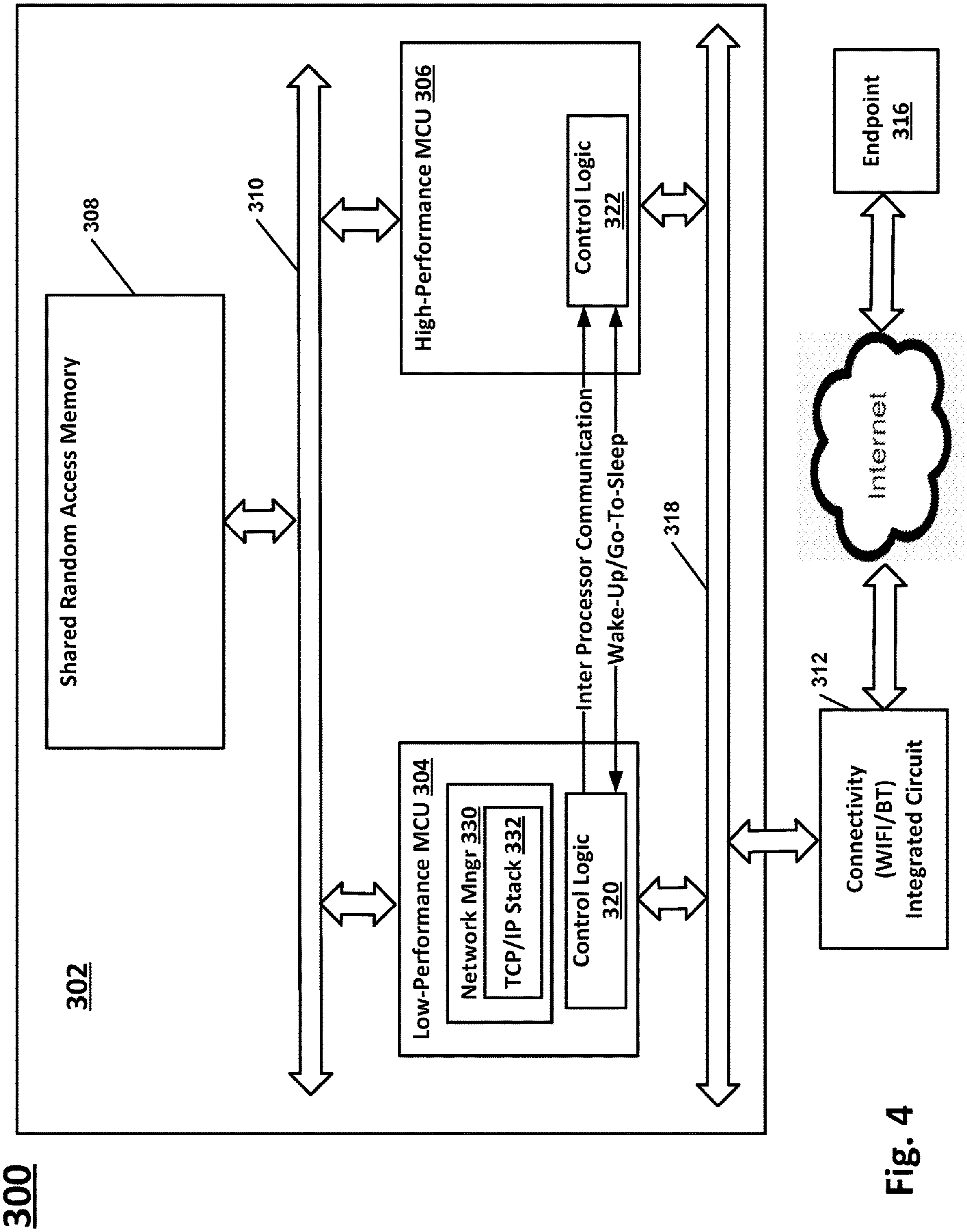
FIG. 4 illustrates one state of the endpoint shown in FIG. 3.

Exclusive implementation of network-manager 330 can transfer back and forth between MCUs 304 and 306 based on predefined triggering events. To illustrate, low-performance MCU 304 on power up may be designated to bring up network-manager 330 including its network stack 332 along with BT/Wi-Fi connectivity. Low-performance MCU 304 can then initiate stack 332 and begin listening for any incoming network connections. FIG. 4 illustrates low-performance MCU 304 implementing network-manager 330 while listening for incoming network connections on a port. FIG. 4 is drawn to show that low-performance MCU 304 exclusively executes instructions of network-manager 330. If low-performance MCU 304 finds a new incoming connection, low-performance MCU 304 accepts it. Low-performance MCU 304 could, but it is not designated to perform read/write of data in accordance with TCP/IP stack 332 in this embodiment. After low-performance MCU 304 accepts an incoming network connection, low-performance MCU 304 can wake up high-performance MCU 306, which is initially in sleep mode to avoid consuming unnecessary power. Low-performance MCU 304 can send a wake-up call and IPC messages to high-performance MCU 306 along with the details (e.g., identity of a network socket) of the accepted incoming network connection. Low-performance MCU 304 can also transfer control over network-manager 330 by providing high-performance MCU 306 with an IPC massage that includes a handle of network-manager 330. Low-performance MCU 304 may set the state of network-manager 330 in memory 308 to indicate high-performance MCU 306 implements the network-manager. After low-performance MCU 304 transfers control of network-manager 330 to high-performance MCU 306, low-performance MCU 304 will not implement network manager 330 until control of network-manager 330 is returned back to MCU 304; network-manager 330 will be implemented by high-performance MCU 306 after control of network-manager 330 is transferred to MCU 306.

Figure 5:
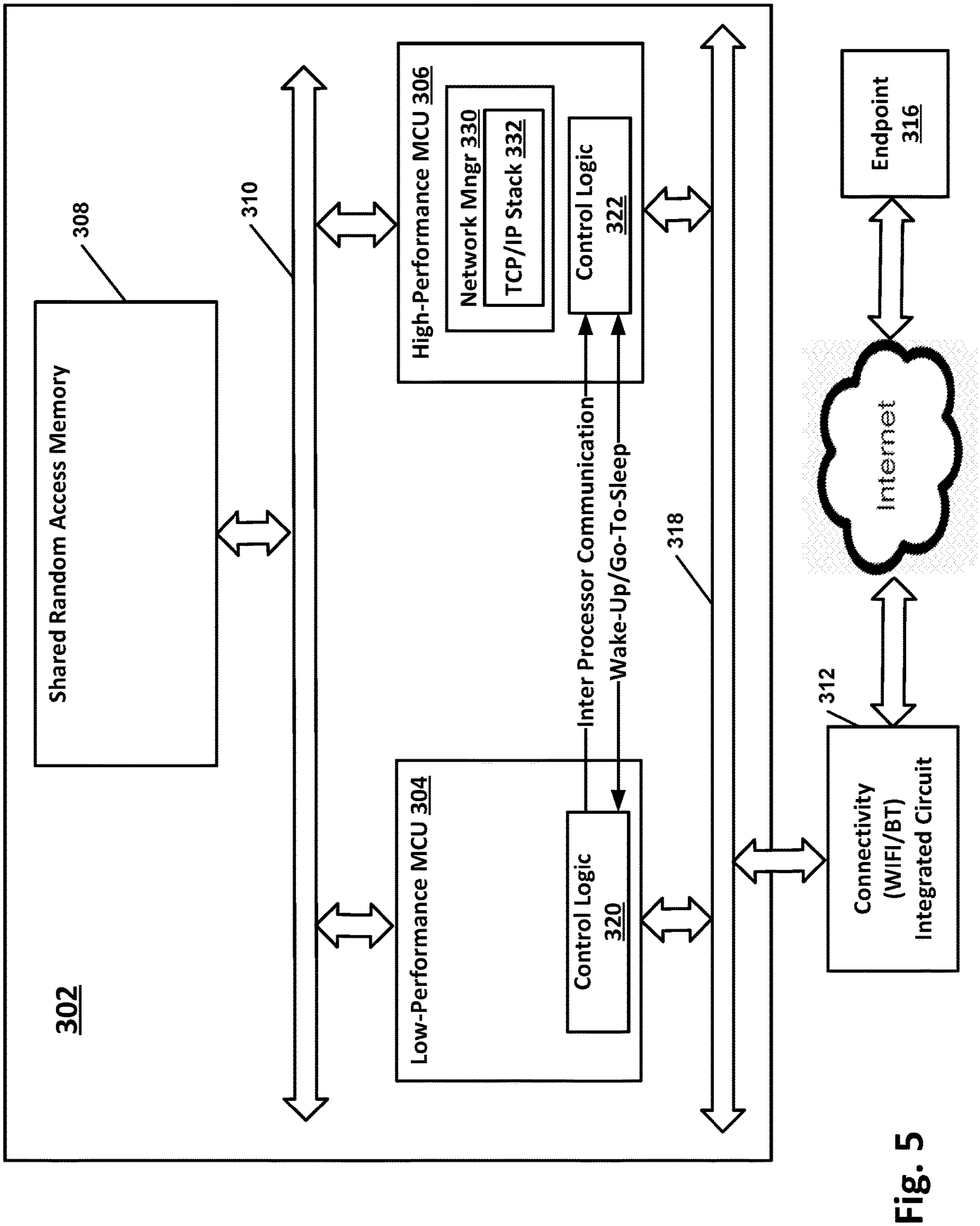
FIG. 5 illustrates another state of the endpoint shown in FIG. 3.

After high-performance MCU 306 wakes up from sleep mode and takes control in response to the IPC messages received from low-performance MCU 304, network-manager 330 with its internal state retained is transferred to high-performance MCU 306. High-performance MCU 306 brings up the network-manager 330 in active mode. In active mode, high-performance MCU 306 reads/writes data through the socket provided by low-performance MCU 304. Since high-performance MCU 306 operates at a higher frequency, data transfer between it and interconnectivity IC 312 will be greater, and hence high-performance MCU 306 will be able to provide higher data throughput when compared to the ability of low-performance MCU 304. FIG. 5 illustrates high-performance MCU 306 implementing network-manager 330 reading/writing data. FIG. 4 is drawn to show that high-performance MCU 306 exclusively executes instructions of network-manager 330.

Once network-manager 330 determines that no active network connection exists or the network connection is idle, high-performance MCU 306 can initiate a transfer of control over network-manager 330 back to low-performance MCU 304 by providing it the network handle in one or more IPC messages. High-performance MCU 306 may then put itself into a passive mode. Once network-manager 330 and/or high-performance MCU 306 goes to passive mode, high-performance MCU 306 will transition to sleep mode to avoid consuming any unnecessary power from the battery. In this way low-performance MCU 304 assumes control over network-manager 330 and will start listening for and accepting a new network connection. Low-performance MCU 304 may consume less power than high-performance MCU 306 while listening for and accepting a new network connection.

In the above description, some portions of the detailed description are presented in terms of algorithms and symbolic representations of operations on analog signals and/or digital signals or data bits within a non-transitory storage medium. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as data, bits, values, elements, symbols, characters, terms, numbers, or the like.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the disclosure. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "performing," "generating," "determining," "placing," or the like, refer to the actions and processes of an integrated circuit (IC) controller, or similar electronic device, that manipulates and transforms data represented as physical (e.g., electronic) quantities within the controller's registers and memories into other data similarly represented as physical quantities within the controller memories or registers or other such information non-transitory storage medium.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus for performing the operations herein. This apparatus may be specially constructed for the required purposes, or it may comprise firmware or hardware logic selectively activated or reconfigured by the apparatus. Such firmware may be stored in a non-transitory computer-readable storage medium, such as, but not limited to, read-only memories (ROMs), random access memories (RAMs), EPROMs, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

a first microcontroller unit (MCU) receiving a first message while operating in active mode;

the first MCU generating and sending a first inter processor communication (IPC) message to a second MCU in response to the first MCU receiving the first message;

the first MCU transitioning from active mode to sleep mode after the first MCU sends the first IPC message to the second MCU;

the second MCU transitioning from sleep mode to active mode in response to the second MCU receiving the first IPC message, wherein the first IPC message includes a memory address in a shared memory associated with a program being executed by the first MCU, the memory address indicating a point within the program from which the second MCU is to resume execution;

the second MCU responding to the first message after transitioning to active mode;

wherein the first MCU is in sleep mode while the second MCU responds to the first message;

wherein the second MCU consumes more power operating in active mode than the first MCU consumes while operating in active mode.

2. The method of claim 1 wherein the first message comprises a message to establish a network connection.

3. The method of claim 2 wherein the second MCU transfers or receives data in packets while responding to the first message.

4. The method of claim 1, wherein the first MCU operates at a first clock speed while operating in active mode, wherein the second MCU operates at a second clock speed while operating in active mode, and wherein the second clock speed is greater than the first clock speed.

5. The method of claim 1 wherein the information first message comprises an internet protocol (IP) address and a port identifier.

6. The method of claim 1 wherein the first MCU executes instructions of an application stored in a memory while operating in active mode, and wherein the second MCU executes instructions of the application in the memory while operating in active mode.

7. The method of claim 6 wherein the first IPC message comprises an address in the memory where instructions of the application are stored.

8. The method of claim 1 further comprising:

the second MCU generating and sending a second IPC message to the first MCU after the second MCU responds to the first message;

the second MCU transitioning to sleep mode after the second MCU sends the second IPC message to the first MCU, and;

the first MCU transitioning to active mode in response to the first MCU receiving the second IPC message.

9. The method of claim 1 further comprising:

the first and second MCUs receiving a second message;

the second MCU, but not the first MCU, accepting the second message, and;

the second MCU responding to the second message.

10. An apparatus comprising:

an integrated circuit comprising:

first and second microcontroller units (MCUs);

a data bus coupled to the first and second MCUs;

wherein the first MCU is configured to send a first inter processor communication (IPC) message to the second MCU in response to the first MCU receiving and accepting a first message to establish a network data connection with an endpoint;

wherein the first MCU is configured to transition from active mode to sleep mode after the first MCU sends the first IPC message to the second MCU;

wherein the second MCU is configured to transition from sleep mode to active mode in response to the second MCU receiving the first IPC message, wherein the first IPC message includes a memory address in a shared memory associated with a program being executed by the first MCU, the memory address indicating a point within the program from which the second MCU is to resume execution;

wherein the second MCU is configured to respond to the first message while operating in active mode.

11. The apparatus of claim 10:

wherein the first MCU is limited to operating at a first clock rate when in active mode, and;

wherein the second MCU operates at a second clock rate that exceeds the first clock rate when in active mode.

12. The apparatus of claim 10 wherein the second MCU consumes more power while operating in active mode than the first MCU consumes while operating in active mode.

13. The apparatus of claim 10 wherein the second MCU transfers data packets to or receives data packets from the endpoint while responding to the first message.

14. The apparatus of claim 10 further comprising:

a memory accessible by the first and second MCUs and configured to store instructions of a network-manager that are executable by the first and second MCUs;

wherein the first message comprises an address in the memory where instructions of the network-manager are stored.

15. The apparatus of claim 10:

wherein the second MCU can generate and send a second IPC message to the first MCU after the second MCU responds to the first message;

wherein the second MCU can transition to sleep mode after the second MCU sends a second message to the first MCU, and;

wherein the first MCU can transition to active mode in response to the first MCU receiving the second message.

16. An apparatus comprising:

an integrated circuit comprising:

a memory for storing instructions;

first and second microcontroller units (MCUs) that can operate in active and sleep modes;

wherein the first MCU is configured to execute the instructions only when the first MCU operates in active mode;

wherein the second MCU is configured to execute the instructions only when the second MCU operates in active mode;

the first MCU can accept a first message from an endpoint for establishing a network connection in response to executing instructions stored in the memory;

wherein the first MCU is configured to transition from active mode to sleep mode after the first MCU accepts the first message;

wherein the second MCU is configured to transition from sleep mode to active mode after the first MCU accepts the first message, wherein the first IPC message includes a memory address in a shared memory associated with a program being executed by the first MCU, the memory address indicating a point within the program from which the second MCU is to resume execution;

wherein the second MCU is configured to transmit data to or receive data from the endpoint while operating in active mode and executing instructions stored in the memory.

17. The apparatus of claim 16:

wherein the first MCU can generate and send a first inter processor communication (IPC) message to the second MCU in response to the first MCU accepting the first message;

wherein the first MCU can transition to sleep mode after the first MCU sends the first IPC message to the second MCU;

wherein the second MCU can transition from sleep mode to active mode in response to the second MCU receiving the first IPC message.

18. The apparatus of claim 16 wherein the second MCU consumes more power while operating in active mode than the first MCU consumes while operating in active mode.

* * * * *